Sept. 15, 1970     W. D. HAENTJENS     3,528,310
PUMP TRANSMISSION AND MOTOR
Filed Aug. 21, 1968     2 Sheets-Sheet 1
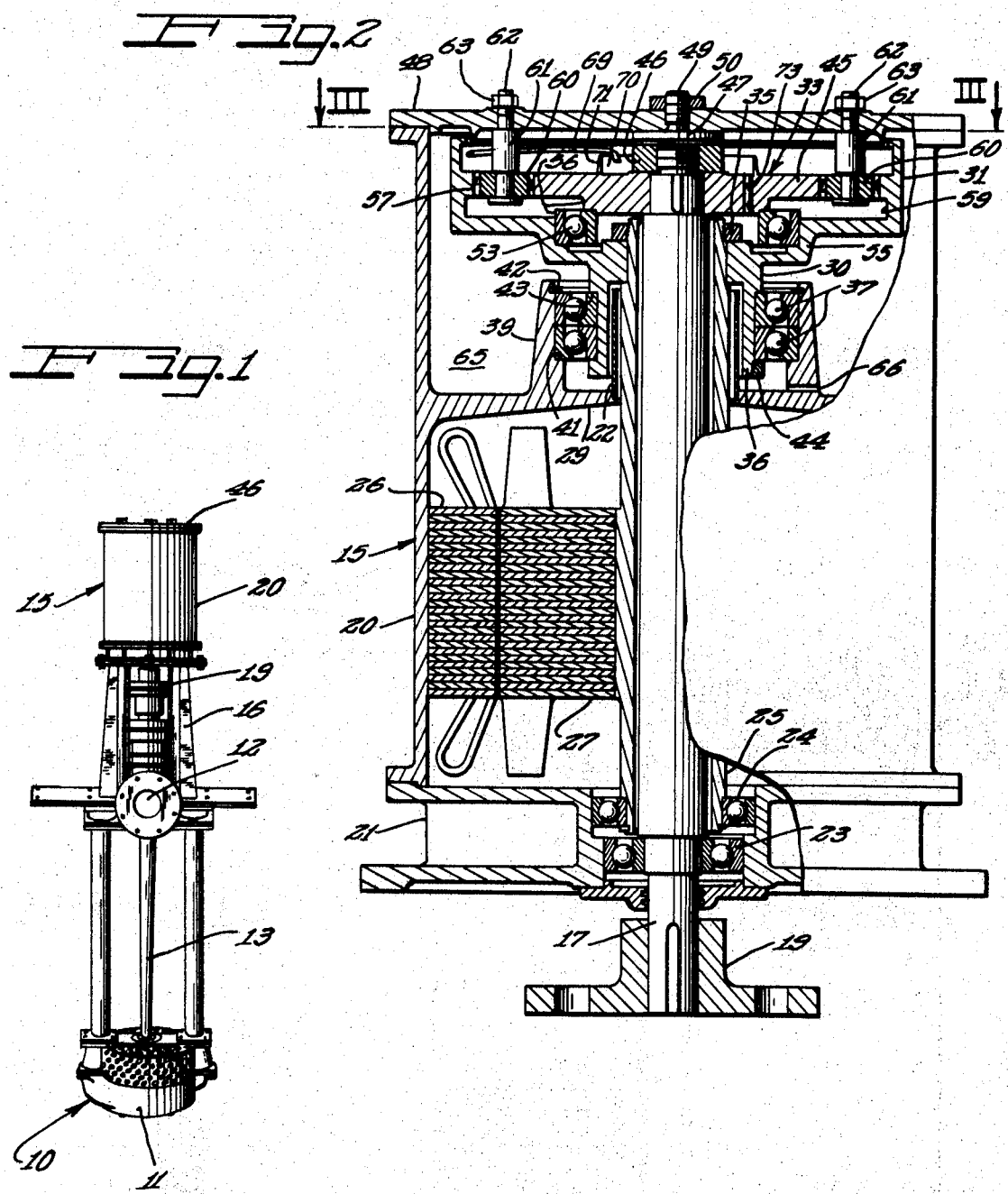
INVENTOR.
*Walter D. Haentjens*
BY *Hill, Sherman, Meroni, Gross & Simpson*     ATTORNEYS Sept. 15, 1970   W. D. HAENTJENS   3,528,310
PUMP TRANSMISSION AND MOTOR
Filed Aug. 21, 1968   2 Sheets-Sheet 2

INVENTOR.
Walter D. Haentjens
BY   ATTORNEYS

United States Patent Office 3,528,310
Patented Sept. 15, 1970

3,528,310
PUMP TRANSMISSION AND MOTOR
Walter D. Haentjens, R.D. 1, Sugarloaf, Pa. 18249
Filed Aug. 21, 1968, Ser. No. 754,241
Int. Cl. H02k 7/06; F16h 1/20
U.S. Cl. 74—421   6 Claims

ABSTRACT OF THE DISCLOSURE

Induction 60 cycle alternating current motor for pumps and the like, designed to fill the speed gap between two and four pole 60 cycle motors rotating at 3600 r.p.m. and 1800 r.p.m. respectively and to provide a 2500 r.p.m. 60 cycle motor as a standard type of motor. This 2500 r.p.m. motor cannot be attained electrically at 60 cycles and is achieved by stepping up the speed of the rotor of a four pole motor and by providing a motor drive shaft concentric with the rotor shaft and driven at the stepped up speed by a step up geared unit contained within the motor housing.

BACKGROUND AND OBJECTS OF INVENTION

In the design of motors for driving pumps, there is a practical range of impeller diameters usable for a given pump capacity which will not create an undesirable loss in efficiency. Induction pump motors have been designed for energization from a 60 cycle source of power, and a speed of 1800 r.p.m. minus the slip speed has been achieved with a four pole 60 cycle synchronous motor while the next higher speed is a motor speed of 3600 r.p.m., attained by the use of a two pole 60 cycle motor. This leaves a gap of 1800 r.p.m. between the two motors and no way has been found to fill this gap without detrimental hydraulic design criteria, or changing the frequency of energization of the motor, which is objectionable with standard pump motors. Thus, in order to provide the required pump delivery head in the range of between 1800 r.p.m. and 3600 r.p.m. it has been necessary to provide a different head pump than either the 1800 or 3600 r.p.m. pumps with larger motors and impellers.

An object of the present invention, therefore, is to provide a squirrel cage or synchronous induction motor for driving pumps and the like which will bridge the speed gap between 1800 r.p.m. and 3600 r.p.m.

Another object of the invention is to convert a standard size 1800 r.p.m. pump to a 2500 r.p.m. pump to provide the pumping head required to fill the gap between the 1800 and 3600 r.p.m. pumps heretofore in operation.

A further object of the invention is to provide an improved form of vertical induction pump motor of the squirrel cage or synchronous type in which the speed gap between 1800 r.p.m. and 3600 r.p.m. is filled by providing the rotor of the pump motor with a hollow shaft, by providing a pump drive shaft extending along the hollow shaft and by driving the drive shaft from the rotor through step up gearing.

Another object of the invention is to fill the capacity gap between 1800 and 3600 r.p.m. pumps without a detrimental variation in the hydraulic design criteria by utilizing an 1800 r.p.m. induction motor as the drive motor for the pump and by stepping up the speed of the motor to 2500 r.p.m. by a compact arrangement of step up gearing all contained within the housing for the motor.

Still another object of the invention is to provide a simple and improved form of vertical pump in which the rotor speed of the pump motor is stepped up by step up gearing arranged like planetary gearing to require a minimum amount of space and to provide the pump head to fill the gap between 1800 and 3600 r.p.m. direct drive centrifugal pumps.

These and other objects of the invention will appear from time to time as the following specification proceeds and with reference to the accompanying drawings.

DESCRIPTION OF THE DRAWINGS

FIG. 1 is a view in side elevation of a direct drive centrifugal pump, showing a drive motor therefor constructed in accordance with the principles of the present invention.

FIG. 2 is a partial fragmentary vertical sectional view taken through the pump motor.

DESCRIPTION OF PREFERRED EMBODIMENT OF INVENTION

Figure 3:
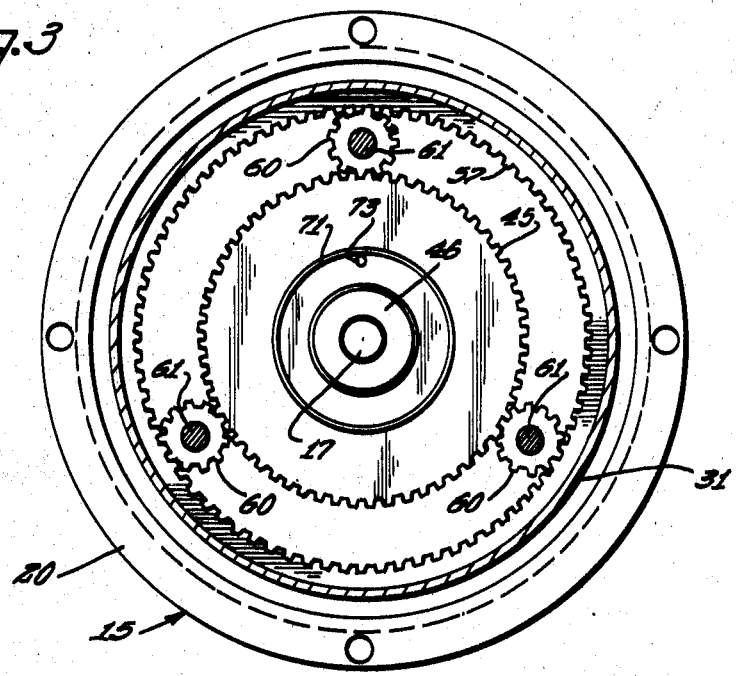
FIG. 3 is a fragmentary horizontal sectional view taken substantially along line III—III of FIG. 2.

In FIG. 1 of the drawings, I have shown a vertical centrifugal pump 10 of a type in which a pump housing 11 is adapted to be submerged in liquid and raise and deliver the liquid through a vertically spaced outlet 12, as in Pat. Nos. 2,625,110, 2,890,659 and 3,066,612. The pump generally has an impeller (not shown) driven from a vertical impeller shaft 13 directly driven from a vertical motor 15, supported in vertically spaced relation with respect to the pump housing 11 on a support structure 16. The motor 15 has a drive shaft 17 directly connected with the impeller shaft through a coupling 19 in a conventional manner.

The motor 15 may be a four pole 60 cycle alternating current induction motor, housed within a motor housing 20, closed at its bottom by a base frame 21 forming a support at its center for an antifriction bearing 23 for the lower end portion of the drive shaft 17, and for a vertically spaced antifriction bearing 24 forming a bearing and support for the lower end portion of a hollow rotor shaft 25 coaxial with and extending along said drive shaft. A conventional stator 26 is suitably mounted within the motor housing 20 and extends about a rotor 27 on the rotor shaft 25, which is also of a conventional structure so need not herein be shown or described further.

The motor herein shown is a 60 cycle alternating current induction motor rotatable at a speed of 1800 r.p.m. with the slip of the rotor giving a motor speed of approximately 1770 r.p.m. The hollow rotor shaft 25 extends upwardly through an intermediate partition 29 within the motor housing and through a hub 30 of a casing 31 of planetary like arrangement of step up gearing 33. A lock nut 35 is provided to clamp said rotor shaft to said hub 30.

The hub 30 has a depending annular hub portion 36 spaced radially of the rotor shaft 25 and extending about a sleeve 22 encircling the rotor shaft 25 and extending upwardly from the partition 29 along said rotor shaft in the space between said hub portion and sleeve to a position adjacent the hub 30. A pair of oppositely arranged axial thrust antifriction bearings 37, 37 are mounted within an annular boss 39 extending upwardly of the partition 29 and form a bearing support for the hub portion 36 and casing 31. The lower bearing 37 is shown as abutting a shoulder 41 formed in the annular boss 39 while a snap ring 42 snapped within said annular boss retains the bearings 37, 37 in position within said boss. The upper bearing 37 abuts a downwardly facing shoulder 43 in the hub portion 36, while a lock nut 44 threaded on the hub portion 36 serves to clamp the bearings 37, 37 in position on the hub portion 36, to form an axial thrust bearing support therefor, taking vertical thrusts on the rotor shaft 25 in up and down directions.

A spur gear 45 is keyed or otherwise secured to the upper end portion of the drive shaft 17 and is locked thereto as by a nut 46. The upper face of the nut 46 forms a thrust bearing engageable with a bearing plate 47 on the underside of a cover 48 for the motor housing 20. As shown in FIG. 2 the bearing plate 47 has a stud 49 extending upwardly therefrom, threaded within the cover 48 and held in position by a nut 50 threaded thereon. The upper end portion of the drive shaft 17 and the gear 45 are journalled in the casing 31 concentric with the rotor shaft 25 by an antifriction thrust bearing 53 mounted in a recessed portion 55 of the casing 31, and forming a bearing support for a hub 56 of the gear 45. The bearing 53 is arranged to take axial thrusts in a downward direction and thus forms a support and suspension means for the drive shaft 17.

The rotor 27 and rotor shaft 25 are thus rotatably supported by the hub portion 36 of the casing 31, which takes up and down vertical thrusts on said casing and also forms a drive member for said casing. The upper end portion of the drive shaft 25 is also supported in the casing 31 on the gear 45 through the axial thrust bearing 53 which cooperates with the bearing 23 to support said drive shaft for rotation about an axis coaxial with the axis of rotation of the rotor shaft 25. The bearing plate 47 also cooperates with the top surface of the nut 46, to provide a thrust bearing for the drive shaft 17, in the event of a momentary up-thrust exceeding the weight of the rotor 27 and rotor shaft 25, as well as the casing 31 and planetary like arrangement of step up gearing 33 supported thereby.

The step up gearing 33 includes an internal gear 57, shown as being formed integrally with an internal cylindrical wall 59 of the casing 31 and meshing with pinions 60, which in turn mesh with the teeth of the spur gear 45. The pinions 60 are mounted on the lower end portions of vertical pinion shafts 61, having reduced diameter upper end portions 62 extending through the top cover 48 and secured thereto as by nuts 63. Energization of the stator 26 will thus effect a stepped up drive to the drive shaft 17 at an intermediate speed which could not be attained by a squirrel cage or synchronous induction motor having a next fewer number of poles than the poles of the stator 26.

In order to maintain the bearings lubricated, the bearings 37 are partially submerged in oil contained in a reservoir 65 within the motor housing 20 above the partition 29 and entering the space between the sleeve 22 and the interior of the annular boss 39 through a passageway 66. The level of oil is at least to the top of the lower bearing 37. The bearings 37 thus act as pumps and draw oil up through the hollow boss 39, where it is thrown to the outer wall of the housing and returned through the passageway 66.

The interior of the casing 31 forms an oil reservoir for the bearing 53. The oil from below the bearing is pumped by the bearing up the the large diameter portion of the casing, where it is thrown by centrifugal force through the gears of the step up gearing to the upper portion of the casing. The oil circulating about the upper portion of the casing is picked up by oil scoop tubes 69 which pipe the oil back to a chamber 70 formed by an annular wall 71 projecting upwardly of the top face of the gear 45. A drain passageway 73 drains oil in the chamber 70 back to the oil reservoir.

The bearings 23 and 24 at the lower end of the rotor shaft 25 and the driven shaft 17 may be lubricated by any conventional grease arrangement or may be sealed bearings, sealed for life.

Figure 4:
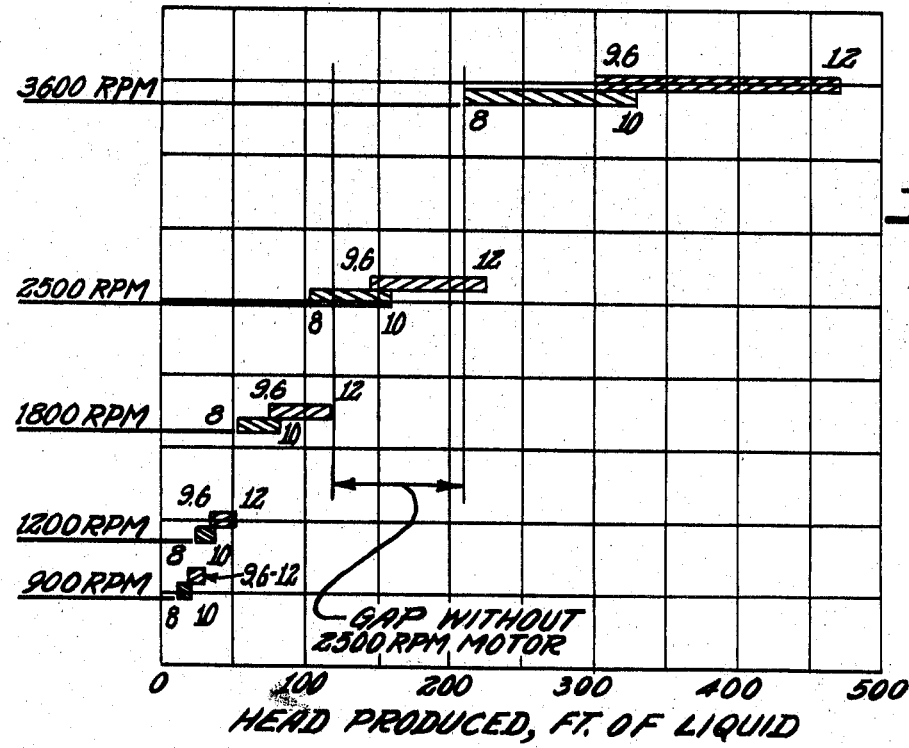
FIG. 4 is a graph illustrating typical impeller ranges and currently available motor speeds for pumping liquids in the capacity range of approximately 500 g.p.m. along with the performance of said impeller diameter range operating at the proposed speed.

In FIG. 4 I have shown a graph showing impeller diameter and motor speeds for raising and delivering liquids at various hydraulic heads (pressure). As for example, an 1800 r.p.m. impeller with a diameter range of 9.6" to 12" will develop approximately between 75 feet and 118 feet of hydraulic head. An impeller range from 8" to 10" in diameter at the same speed will develop from approximately 52 feet to 82 feet of hydraulic head. In the lower speeds the range of head developed from 12 feet to 30 feet is taken care of by impellers rotating at approximately 900 r.p.m. At 1200 r.p.m., using a diameter range between 8" to 12", the head range would be between approximately 22 feet to 52 feet. Thus the head developed from 12 feet to 118 feet is covered by the use of 900, 1200 and 1800 r.p.m. motors.

Note that these diameter ranges are approximately the maximum and minimum impellers efficiently usable in a specific centrifugal pump design. Thus the chart shows the performance for two (2) centrifugal pumps designed to cover the broad range of hydraulic head. The example is for pumps in the capacity range of approximately 500 g.p.m.

The next higher speed range after 1800 r.p.m. attainable by conventional 60 cycle motors is 3600 r.p.m., which gives a hydraulic head of from 210 feet of liquid to 330 feet, using impellers in the diameter range from 8" to 10" and gives a hydraulic head of approximately 300 feet to 470 feet for impeller diameter ranges between 9.6" and 12".

This leaves a wide gap of almost 100 feet of hydraulic head between the 1800 r.p.m. motor driven impellers and the 3600 r.p.m. motor driven impellers. This gap is filled by the 2500 r.p.m. motor driven impellers of the present invention, giving a hydraulic head for example of approximately 102 feet to 158 feet for impellers in the range of between 8" and 10" in diameter, and from 145 feet to 225 feet for impellers in the range of 9.6" to 12" in diameter.

The present 2500 r.p.m. motor thus gives an entirely new induction motor output speed for pumps, and permits a pump developed head range for the same general size pumps to fill the gap between 1800 r.p.m. and 3600 r.p.m. driving speeds and makes it possible to provide a complete line of pumps, using a minimum number of specific designs, to cover the entire head range from substantially zero to 470 feet (as an example).

While I have herein shown and described one form in which the invention may be embodied, it may readily be understood that various variations and modifications in the invention may be attained without departing from the spirit and scope of the novel concepts thereof.

I claim as my invention:

1. An induction motor particularly adapted for pumps and the like and operable in the speed range in the gap between two conventional lower and upper motor speeds attained by a pre-selected even number of poles, and energized at the same frequencies of energization comprising:
   a motor housing,
   a stator within said housing,
   a hollow rotor shaft journalled within said housing,
   a rotor on said shaft,
   a drive shaft extending along said hollow rotor shaft and journalled for rotation about an axis coaxial with the axis of rotation of said hollow rotor shaft, and
   a step up drive connection contained within said housing including a casing journalled within said housing and driven by said hollow rotor shaft, an internal gear on said casing, step up gearing within the confines of said internal gear and having drive connection with said drive shaft, for driving said drive shaft at a fixed speed of rotation, higher than the speed of rotation of said rotor and lower than the speed of rotation of a corresponding induction motor energized at the same frequency and in a next higher speed range.

2. An induction motor in accordance with claim 1,
wherein the motor housing has an intermediate wall spaced above the rotor,
wherein axial thrust bearings are supported by said intermediate wall and support said casing and suspend said rotor and said rotor shaft from said intermediate wall, and
wherein other bearings carried by said casing suspend said drive shaft therefrom.

3. An induction motor in accordance with claim 1,
wherein the hollow rotor shaft is a vertical shaft,
wherein the motor housing has an intermediate wall extending thereacross and disposed above said rotor,
wherein a top cover closes said motor housing,
wherein the step up gearing includes pinions suspended from said top cover, and meshed with and driven from said internal gear a sun gear meshing with and driven from said pinions and having driving connection with said drive shaft,
wherein the casing has a hub secured to said hollow rotor shaft and an annular hub portion depending therefrom and spaced from said hollow rotor shaft,
wherein a pair of axial thrust bearings support said hub, casing and hollow rotor shaft for rotation about a vertical axis, and
wherein an axial thrust bearing forms a bearing support for said sun gear and drive shaft, supporting said gear and drive shaft for rotation about an axis coaxial of the axis of rotation of said hollow rotor shaft.

4. A vertical axis induction motor in accordance with claim 3,
wherein an annular boss extends upwardly of said intermediate wall along said annular hub portion of said casing, and
wherein said axial thrust bearings are mounted in said annular boss and take the thrusts on said hollow rotor shaft in opposite directions and suspend said hollow rotor shaft and said rotor from said intermediate wall.

5. A vertical axis induction motor in accordance with claim 3,
wherein an annular boss extends upwardly of said intermediate wall along said annular hub portion and is spaced radially outwardly therefrom and forms a bearing support for said annular hub portion of said casing,
wherein a sleeve extends upwardly of said intermediate wall in the space between said hollow rotor shaft and said annular hub portion and cooperates with said annular boss and casing to define an oil reservoir in which the oil is circulated by said bearings to the region outside of and above said annular boss, and
wherein a passageway leads through said annular boss adjacent said partition, to accommodate the return of oil to the oil reservoir defined by said annular boss and sleeve.

6. A vertical axis induction motor in accordance with claim 3,
wherein the casing for the set up gearing forms an oil reservoir,
wherein the bearing carried thereby and supporting said sun gear and drive shaft pumps the oil to said sun gear and pinions meshing therewith,
wherein an annular wall extends upwardly of said sun gear and forms an oil return chamber,
wherein an oil scoop tube is provided to return oil from the periphery of said casing to said oil return chamber, and
wherein an oil passageway is provided leading through said sun gear for returning oil to said oil reservoir and bearing.

References Cited
UNITED STATES PATENTS

| | | | |
|---|---|---|---|
| 2,250,098 | 7/1941 | Abel. | |
| 2,252,967 | 8/1941 | Forton | 74—413 |
| 2,745,525 | 5/1956 | Hale. | |
| 2,926,542 | 3/1960 | Schmitter et al. | |
| 3,153,158 | 10/1964 | Schmitter | 310—83 |
| 3,430,509 | 3/1969 | Couris | 74—413 |

LEONARD H. GERIN, Primary Examiner

U.S. Cl. X.R.

74—413, 467; 184—13; 310—83